US007826160B2

United States Patent
Sato et al.

(10) Patent No.: US 7,826,160 B2
(45) Date of Patent: Nov. 2, 2010

(54) SIGNAL REPRODUCING METHOD, MAGNETIC HEAD AND MAGNETIC RECORDING AND REPRODUCING APPARATUS

(75) Inventors: Rie Sato, Yokohama (JP); Koichi Mizushima, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/233,629

(22) Filed: Sep. 19, 2008

(65) Prior Publication Data

US 2009/0086354 A1 Apr. 2, 2009

(30) Foreign Application Priority Data

Sep. 26, 2007 (JP) ............................. 2007-249650

(51) Int. Cl.
G11B 20/06 (2006.01)

(52) U.S. Cl. ............................ 360/30; 360/46; 360/324
(58) Field of Classification Search ...................... None
See application file for complete search history.

(56) References Cited

U.S. PATENT DOCUMENTS

| 4,247,866 | A  | * | 1/1981  | Wilber et al. ................... 386/9 |
| 4,481,546 | A  | * | 11/1984 | Ito et al. ........................ 360/30 |
| 6,798,623 | B2 | * | 9/2004  | Seigler et al. ................ 360/324 |
| 7,471,491 | B2 | * | 12/2008 | Sato et al. ..................... 360/313 |
| 7,602,588 | B2 | * | 10/2009 | Sato et al. ..................... 360/324 |
| 7,633,699 | B2 | * | 12/2009 | Kaka et al. ..................... 360/67 |
| 2005/0023938 | A1 |   | 2/2005  | Sato et al. ..................... 310/363 |
| 2006/0222835 | A1 | * | 10/2006 | Kudo et al. .................. 428/212 |

FOREIGN PATENT DOCUMENTS

JP 2006-28609 2/2006
JP 2006-286093 10/2006

OTHER PUBLICATIONS

Korean Office Action dated Feb. 22, 2010 from corresponding Korean Patent Application No. 10-2008-87743.

* cited by examiner

*Primary Examiner*—Jason C Olson
(74) *Attorney, Agent, or Firm*—Ohlandt, Greeley, Ruggiero & Perle, LLP

(57) ABSTRACT

A magnetic head, includes a magnetic oscillation element, the oscillation frequency of which is modulated by a medium magnetic field, and a reproducing device configured to detect a phase difference between the adjacent oscillation signals derived from the magnetic oscillation element and output a phase difference signal as a reproduced signal.

14 Claims, 5 Drawing Sheets

SIGNAL REPRODUCING METHOD, MAGNETIC HEAD AND MAGNETIC RECORDING AND REPRODUCING APPARATUS

CROSS-REFERENCE TO RELATED APPLICATIONS

This application is based upon and claims the benefit of priority from prior Japanese Patent Applications No. 2007-249650, filed Sep. 26, 2007, the entire contents of which are incorporated herein by reference.

BACKGROUND OF THE INVENTION

1. Field of the Invention

The present invention relates to a signal reproducing method for generating a reproduced signal using a magnetic oscillation device whose oscillation frequency is modulated by a magnetic field, a magnetic head using the magnetic oscillation device, and a magnetic recording and reproducing apparatus.

2. Description of the Related Art

A recording density of magnetic recording has improved at remarkable speed since appearance of a GMR head using a giant magneto resistance effect (GMR effect). A GMR element comprises a laminated layer having a sandwich structure of ferromagnetic layer, a nonmagnetic layer and a ferromagnetic layer. The GMR element is an element to detect a change of a relative angle between the magnetization directions of two ferromagnetic layers as a change of resistance value by applying an exchange bias to one ferromagnetic layer to fix magnetization and changing the magnetization direction of the other ferromagnetic layer by an external magnetic field, so-called an element using a magnetoresistance effect of a spin valve film.

A CIP-GMR element to detect a change of resistance when a current flows on the film surface of a spin valve film, and a CPP-GMR element to detect a change of resistance when a current flows in a direction vertical to the film surface of the spin valve film have been developed. It is conceived that the CIP-GMR element and the CPP-GMR element both have a magnetic resonance ratio (MR ratio) of around several %, and are able to deal to a recording density of about 200 Gbit/inch². A TMR element using a tunnel magneto resistance effect (TMR effect) has been developed in order to deal with magnetic recording of a higher density.

The TMR element is composed of a laminated layer of ferromagnetic layer, insulator and ferromagnetic layer, and flows a tunneling current by applying a voltage between the ferromagnetic layers. The TMR element is an element which uses a phenomenon that magnitude of the tunneling current varies due to magnetization directions of the upper and lower ferromagnetic layers, and detects a change of a relative angle between magnetization directions as a change of a tunnel resistance value. An element that the MR ratio is around 100% at maximum is provided. Because the TMR element has a larger MR ratio than that of the GMR element, a signal voltage increases. However, there is a problem that a noise component due to a shot noise as well as a pure signal component increases, and thus a signal-to-noise ratio (SN ratio) is not improved.

The shot noise occurs due to fluctuation of a current generated by electrons passing a tunnel barrier in irregularity and increases in proportion to a square root of a tunnel resistance. Therefore, in order to acquire a necessary signal voltage with the shot noise being suppressed, it is necessary to thin the tunnel insulating layer to decrease the tunnel resistance. It is necessary to decrease the element size to a size similar to the recording bit according to increase of the recording density. Accordingly, it is necessary to decrease a junction resistance of the tunnel insulating layers according to increase of the recording density. The junction resistance not more than 1 $\Omega/cm^2$ is needed for the recording density of 300 Gbit/inch², and a tunnel insulating layer having a thickness for two layers of atoms in terms of the film thickness of a Al—O (aluminum oxide film) tunnel insulating layer must be formed. A short circuit is apt to occur between the upper and lower electrodes with a decrease in the thickness of the tunnel insulating layer, resulting in decreasing a MR ratio. Therefore, manufacture of the element becomes difficult.

From the above reasons, it is estimated that a margin of the TMR element will be about 300 Gbit/inch². Any of the above-mentioned elements utilizes a magnetoresistance effect (MR effect) in the general meaning. However, in late years, problems of magnetic white noise common to these magnetic resonance elements occur. Since this noise occurs due to heat fluctuation in minute magnetization unlike the electrical noise such as above-mentioned shot noise, it is thought that it becomes more dominant along with microminiaturization of the MR element and surpasses the electrical noise in the element corresponding to 200-300 Gbpsi.

It is necessary to use a free layer of small magnetic attenuation constant $\alpha$ for the magnetic white noise to be avoided. However, there is a problem that a reading speed decreases with a decrease in $\alpha$. In late years, a magnetic sensor using a minute magnetic oscillation element is proposed as a measure for solving those problems (JP-A No. 2006-28609 (KOKAI)). If the minute magnetic oscillation element is used as a magnetic sensor to utilize a change of oscillation frequency due to a medium magnetic field, the high speed reading is possible even if the free layer of small magnetic attenuation constant $\alpha$ is used. However, there is a problem that S/N decreases since the minute magnetism oscillation element is poor in stability of oscillation frequency.

In the magnetic head and magnetic recording and reproducing apparatus using a magnetic oscillation element whose oscillation frequency varies by a magnetic field and generating a signal by detecting a frequency change of this magnetic oscillation element, it is difficult to reproduce a signal adequately, because the magnetic oscillation element is apt to fluctuate in phase.

The present invention is to provide a magnetic head and a magnetic recording and reproducing apparatus, which use a signal reproducing method and a magnetic oscillation element to reproduce a signal appropriately against a change of phase of the magnetic oscillation element and magnetism oscillation device and which allow a high speed response corresponding to high density recording and a high S/N ratio response.

According to the present invention, there is provided a signal reproducing method for reproducing a reproduced signal by detecting a phase difference between adjacent signals generated from a magnetic oscillation element whose oscillation frequency is modulated by a direction of a magnetic field.

BRIEF SUMMARY OF THE INVENTION

An aspect of the present invention provides a signal reproducing method includes: deriving adjacent signals from a magnetic oscillation element whose oscillation frequency is modulated by a medium magnetic field; and reproducing a medium record signal by detecting a phase difference between the adjacent signals derived from the magnetic oscillation element.

DETAILED DESCRIPTION OF THE INVENTION

There will be described an embodiment of the present invention referring to drawings hereinafter.

When a magnetic oscillation element is used for a magnetic head, it allows a higher speed detection by using a change of the oscillation frequency than using a change of the oscillation amplitude due to a medium magnetic field. This base on the reason that the time of about a magnetic relaxation time period of free layer magnetization is necessary for the amplitude change similarly to a conventional GMR element, but the frequency change occurs for a shorter time than the relaxation time by several digits. However, it must be considered that when the frequency-modulated signal wave is detected (by FM detection), a phase correlation time of a minute magnetic oscillation element is extremely short due to heat fluctuation in magnetization. The phase correlation time period is a time period during which the phase of an oscillation voltage (current) varies by about one radian, and about 1 μs in the case of the minute magnetic oscillation element. A quadrature detection used broadly for receiving a FM broadcast cannot be used for detecting a signal of a magnetic oscillation element in a short phase correlation time, because a detection output varies dependent upon the phase of a signal wave.

It is fundamentally possible to use a synchronous detection method, but the method must synchronize the phase of the reference wave necessary for detection with the phase of a signal wave. In other words, the method must make the phase of a signal wave varying in an extremely short correlation time at random follow a reference wave in a high speed (in time of several ns), therefore, it is difficult to use an existing synchronous detection circuit.

Figure 1:
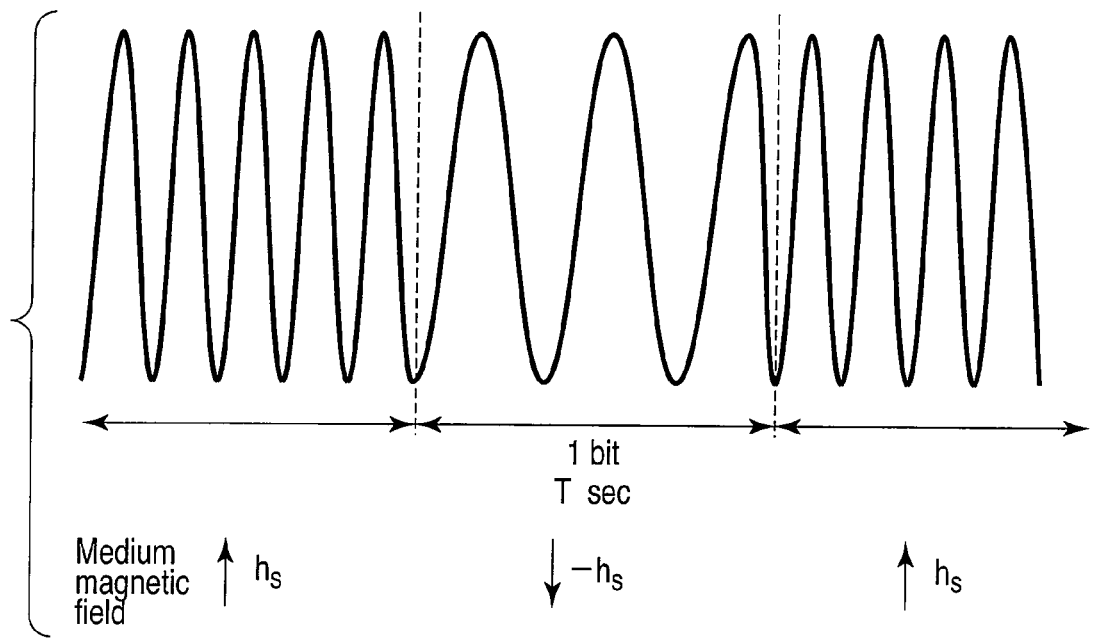
FIG. 1 is a diagram schematically illustrating an output voltage of a magnetic oscillation element.

FIG. 1 shows an output voltage of the magnetic oscillation element typically. It is found from this figure that an oscillation frequency varies depending on a direction of medium magnetic field hs. The time T of 1 bit is about 3 ns (300 Mb/s) in the existing magnetic recording, but future it is expected to be about 1 ns (1 Gb/s). It should be noted that the time T per 1 bit is shorter in comparison with the above-mentioned phase correlation time (about 1 μs). This indicates that the phase of the signal before one bit can be compared with the phase of the current signal with high accuracy. It is found that a record signal of a medium can be reproduced by detecting a phase difference between the phase of the current signal and the phase of the signal of 1 bit before the current signal by focusing attention on this point. Accordingly, the present embodiment provides a method for generating a reproduced signal by detecting a phase difference between adjacent signals derived from a magnetic oscillation element. Delay detection is preferable as a method of detecting a phase difference between the adjacent signals. There will be explained the delay detection hereinafter.

Figure 2:
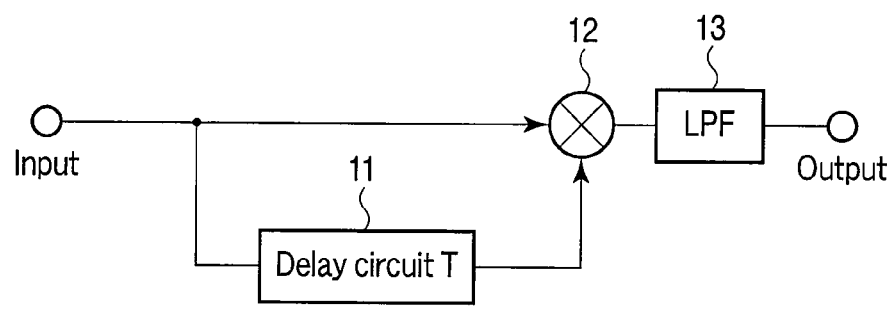
FIG. 2 shows a circuit diagram illustrating a delay detection circuit employed in a reproduction circuit according to a first embodiment.

The circuit shown in FIG. 2 is a detector circuit as referred to as a delay detection circuit. A multiplier 12 multiplies a current signal by a signal of 1 bit (time T) before the current signal, which passed through a delay circuit 11. The product obtained by the multiplier is output through a low pass filter (LPF) 13. The current signal s(t) and the signal s(t−T) of 1 bit before the current signal, that passed through the delay circuit 11 are expressed by the equations (1) and (2).

$$s(t)=A \cos [\omega_0 t+\phi(t)] \quad (1)$$

$$s(t-T)=A \cos [\omega_0(t-T)+\phi(t-T)] \quad (2)$$

where $\omega_0$ is an oscillation frequency (center frequency) when there is no medium magnetic field.

The output voltage v(t) from which a high frequency (microwave) component is removed with a low pass filter is expressed by the equation (3).

$$v(t) = <s(t) \cdot s(t-T)> \quad (3)$$
$$= (A^2/2)\cos[\omega_0 T + \varphi(t) - \varphi(t-T)]$$

When $\omega_0$ is adjusted so that $\omega_0 T = 2n\pi - \pi/2$, the output voltage is expressed by the equation (4).

$$v(t)=(A^2/2)\sin [\phi(t)-\phi(t-T)] \quad (4)$$

Figure 3:
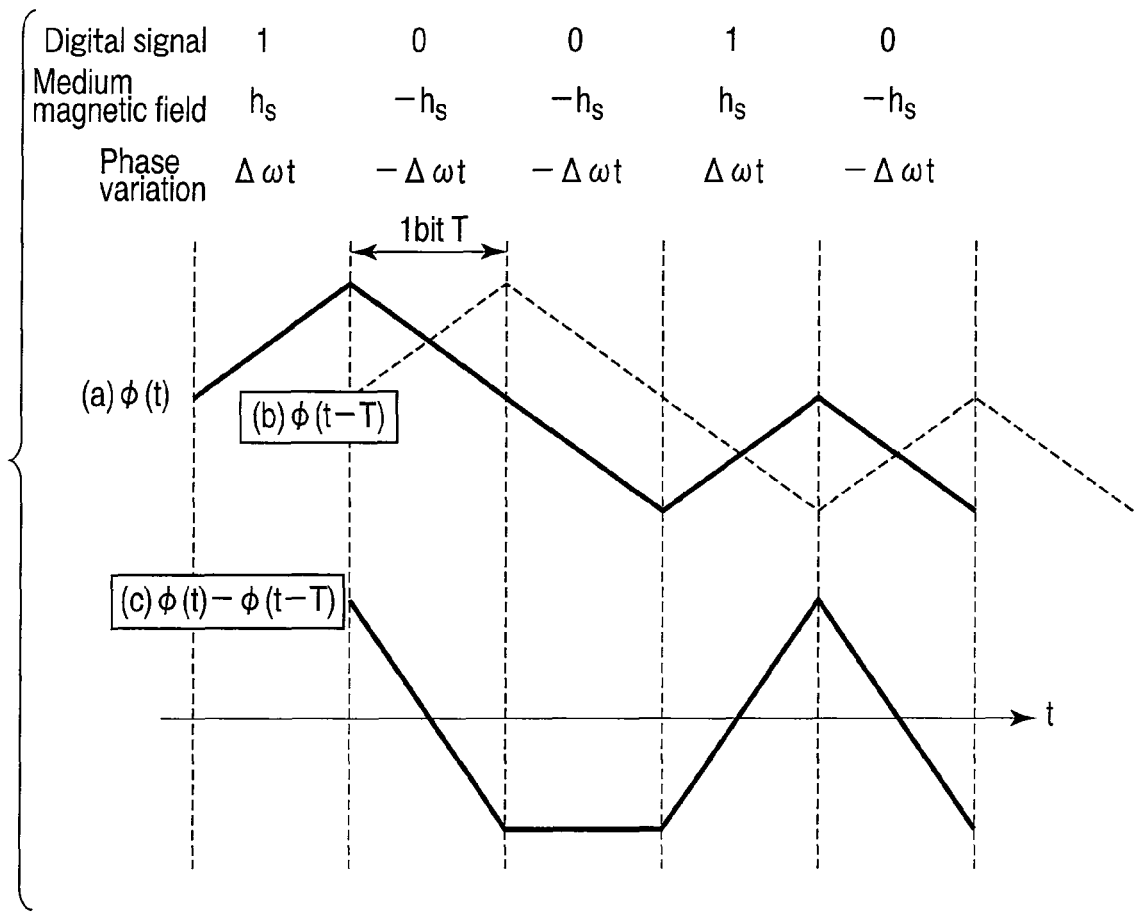
FIG. 3 is a diagram illustrating a state that an oscillation frequency of a magnetic oscillation element varies by a medium magnetic field.

Because the oscillation frequency of the magnetic oscillation device varies by (Δω, −Δω) due to the medium magnetic field (hs, −hs) corresponding to the digital signal of (1,0) recorded on the medium, φ(t), φ(t−T), φ(t)−φ(t−T) of the equation (4) vary as shown in (a), (b) and (c) of FIG. 3.

Figure 4:
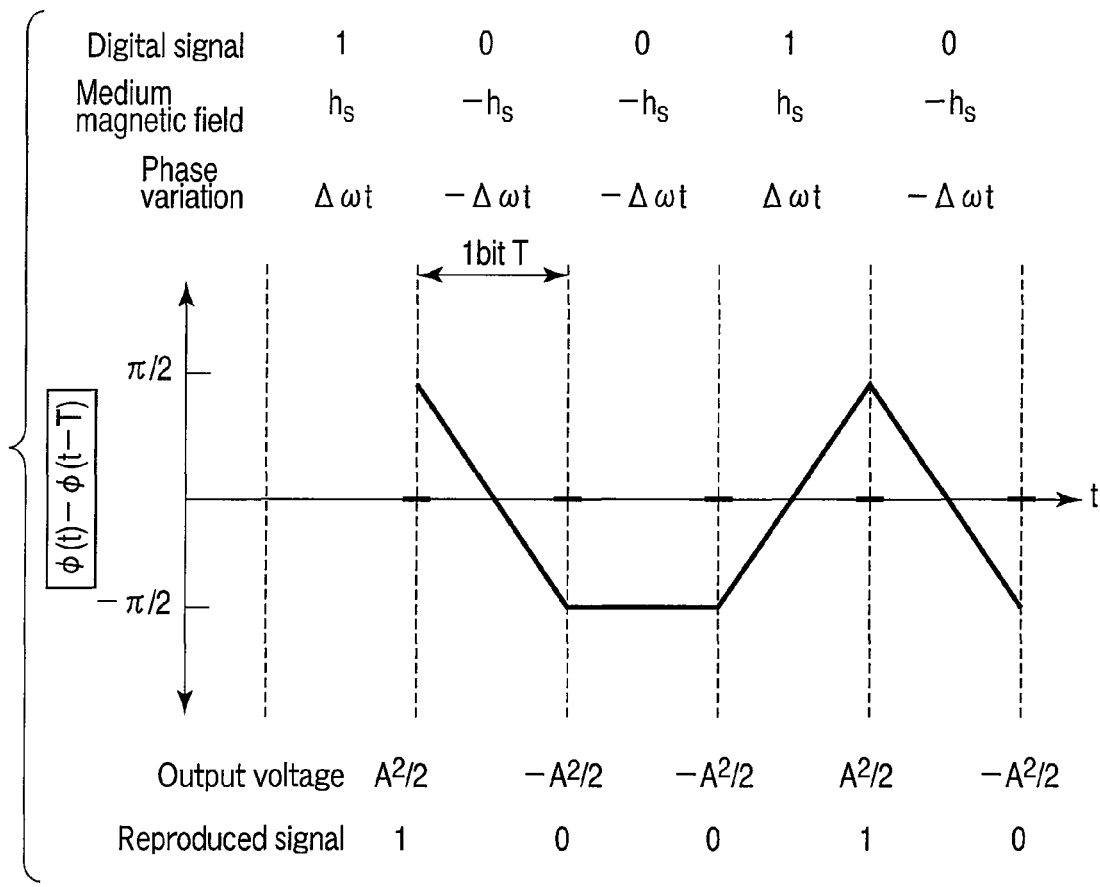
FIG. 4 is a diagram illustrating a phase to be ±π/2 on a border of a bit.

When the medium magnetic field hs is adjusted to be ΔωT=2πΔfT=π/2, φ(t)−φ(t−T) is ±π/2 on the border of a bit as shown in FIG. 4. The output voltage ±A²/2 is provided when the signal is read at this timing, and the digital signal (1,0) recorded on the medium is reproduced.

In the case of ΔωT=2πΔfT=π/2, the modulation exponent m defined in m≡2ΔfT becomes 0.5. The frequency modulation of m=0.5 is referred to as a MSK-system in the field of communication. It is known that the MSK system can transmit a digital signal with a narrow band width in comparison with an ASK (amplitude modulation) system and a PSK (phase modulation) system. Since the Johnson noise or shot noise that is an electrical noise of the magnetic oscillation element increases in proportion to a band width, the MSK system is effective in reducing the noise of the reproduced signal.

It is described above that the quadrature detection method or the existing synchronous detection circuit cannot be used because the phase correlation time 1 of the minute magnetic oscillation device is as short as about 1 μs. It is described hereinafter that a signal can be reproduced by a delay detection method. If the equation (4) is used, the output voltage in the time nT on the border of a bit is expressed by the equation (5).

$$v(nT) = (A^2/2)\sin[\phi(nT) - \phi([n-1]T)] \quad (5)$$

Considering the phase fluctuation $\Delta\phi(t)$ (jitter) of the magnetic oscillation element associated with the heat fluctuation of magnetization of a free layer, the phase $\phi(nT)$ at the time nT can be expressed by the equation (6).

$$\phi(nT) = \phi_0(nT) + \Delta\phi(nT) \quad (6)$$

where $\phi_0(t)$ indicates a phase without fluctuation and satisfies the equation (7).

$$\varphi_0(nT) - \varphi_0([n-1]T) = \pm \Delta\omega T = \pm \frac{\pi}{2} \quad (7)$$

Accordingly, the equation (8) is established and the output voltage is expressed by the equation (9).

$$\varphi(nT) - \varphi([n-1]T) = \pm \frac{\pi}{2} + [\Delta\varphi(nT) - \Delta\varphi([n-1]T)] \quad (8)$$

$$v(nT) = (A^2/2)\sin[\varphi(nT) - \varphi([n-1]T)] \quad (9)$$
$$= \pm(A^2/2)\cos(\Delta\varphi(nT) - \Delta\varphi([n-1]T))$$

When the equation (9) is averaged with respect to n using the equation (10) established with respect to the random phase fluctuation, the equation (11) can be established.

$$<\cos[\Delta\varphi(t) - \Delta\varphi(t-\tau)]> = \exp\left[-\frac{\tau}{T_0}\right] \quad (10)$$

$$<v(nT)> = \pm\frac{A^2}{2}e^{-\frac{T}{T_0}} = \pm\frac{A^2}{2}\left[1 - \frac{T}{T_0}\right] \quad (11)$$

where $T_0$ indicates a phase correlation time expressed by the equation (12), and $\Delta f_{osc}$ indicates an oscillation linewidth.

$$T_0 = \frac{2}{\Delta\omega_{osc}} = \frac{2}{2\pi\Delta f_{osc}} \cong \frac{1}{3}\frac{1}{\Delta f_{osc}} \quad (12)$$

if $\Delta f_{osc} = 1$ MHz, then $T_0 = 0.3$ μs. If T=3 ns (300 Mb/s), $T/T_0 = 0.01$. In this case, the drop of the output voltage due to the phase fluctuation (jitter) of the magnetic oscillation element is slight 1%. The noise voltage $v_n$ occurring due to the phase fluctuation can be evaluated by the equation (13).

$$<v_n^2> = <v(t)^2> - <v(t)>^2 = 2[(A^2/2)]^2\left(\frac{T}{T_0}\right)^2 \quad (13)$$

The signal-to-noise ratio taken only a noise voltage due to the phase fluctuation in consideration is expressed by the equation (14), and indicates an extremely high value.

$$S/N = \frac{<v(t)>}{\sqrt{<v_n^2>}} = \frac{1}{\sqrt{2}}\frac{T_0}{T} \cong 70 \quad (14)$$

In other words, the use of the delay detection method allows the noise voltage generated due to the phase fluctuation of the signal wave to decrease sufficiently. In the case that the reading speed expected in future is 1 Gb/s, the signal-to-noise ratio taken only a noise voltage occurring due to the phase fluctuation in consideration improves further to be S/N=210, because T=1 ns and $T/T_0$=0.003 s.

The detail is omitted herein. However, a medium signal can be reproduced only for a sufficiently shorter time than the phase correlation time because an output voltage is proportional to $\cos\Delta\phi(t)$ in the quadrature detection. On the other hand, it is necessary to use the standard wave phase-synchronized with the input signal wave in the synchronous detection. However, reproduction of the standard wave synchronized with the signal wave having an extremely short correlation time and indicating random phase fluctuation is difficult by an existing synchronous detection circuit using a phase synchronization loop and makes the signal-to-noise ratio degrade.

In the minute magnetic oscillation element, amplitude fluctuation (amplitude noise) as well as phase fluctuation (phase noise) occurs due to heat fluctuation of magnetization, resulting in decreasing the signal-to-noise ratio of the reproduced signal. In order for the amplitude noise to be decreased, it is effective to provide an amplitude control circuit such as a voltage limiter on the previous stage of the detector circuit. For example, in the reproduction circuit shown in FIG. 5, a limiter 22 having a function to limit the amplitude of the detection signal provided from a magnetic oscillation element 21 is connected to the output terminal of the magnetic oscillation element 21. The output terminal of the limiter 22 is connected to the input port of a delay detection device 23. This delay detection device 23 is configured as shown in FIG. 2, and outputs a detection signal obtained by performing low pass filtering on a signal of a product of the current signal and a signal of one bit (time T) before the current signal. The detection signal is input to a discrimination circuit 24 and a timing circuit 25. The discrimination circuit 24 discriminates a bit signal according to the timing signal output from the timing circuit according to the detection signal, and outputs the bit signal.

Figure 5:
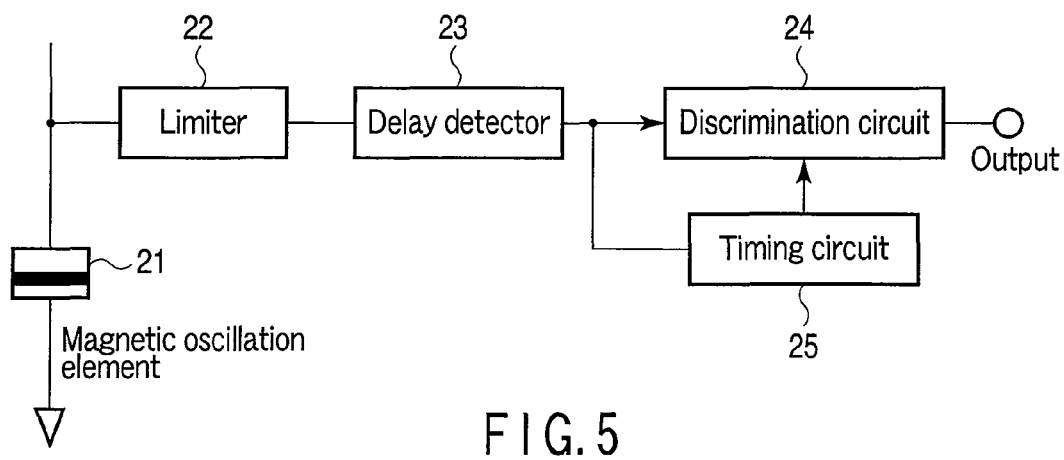
FIG. 5 shows a circuit diagram of a reproduction circuit using the magnetic oscillation element according to the first embodiment.

An in-face magnetic film such as permalloy or cobalt is used for the free layer of the magnetic oscillation element 21 employed in the reproduction circuit of FIG. 5, and demagnetization field occurring with motion of magnetization and varying in a time-variant engages with the oscillation phenomenon. Such an element is unstable in characteristic because there are plural oscillation modes in which frequencies are close to each other and also dispersion between elements is large. It is important to decrease free layer magnetization in order to decrease influence of the demagnetization field and provide an element which has a narrow oscillation linewidth and is stable. Therefore, it is effective to use a free layer of artificial antiferromagnetism or artificial ferrimagnetism. However, when the magnetic oscillation element is used for a magnetic head, it is necessary to be $f_0 = \omega_0/(2\pi) \gg 1/T$ as is apparent from the above explanation, and the oscillation element must be oscillated in a microwave frequency of more than several GHz. In the case of using the in-face magnetic film as the free layer, the oscillation frequency $\omega_0$ is obtained by the equation (15), and oscillation of several GHz is provided under an effective magnetic field H as low as several 1000 Oe. However, when the artificial antiferromagnetism or artificial ferrimagnetism is used, the oscillation frequency is given by the equation (16), and the effective magnetic field of several thousand Oe is necessary for oscillation of several GHz.

$$\omega_0 = \gamma\sqrt{4\pi MH} \quad (15)$$

$$\omega_0 = \gamma H \quad (16)$$

An exchange bias method is available for a strong effective magnetic field to be applied to an artificial antiferromagnetic layer or artificial ferrimagnetic film which is thin and small in synthesis magnetization. This allows oscillation of high frequency without applying a strong external magnetic field.

Another method for decreasing influence of demagnetization field and obtaining a stable element is to use a vertical magnetization film for the free layer. The oscillation frequency of an oscillation element using a vertical magnetization film is obtained by the equation (16), but it is effective to use the vertical magnetization film in order for the oscillation element to oscillate at more than several GHz. Such a vertical magnetization film can use a Co or Co/nonmagnetic material laminated layer or CoCr system alloy such as CoCrTa, CoCrTaPt or CoTaNb, a Co multilayer film such as Co/Pd, Co/Pt or Co—Cr—Ta/Pd, a CoCrPt system alloy, a FePt system alloy, or a SmCo system alloy including rare earths or a TbFeCo alloy.

Figure 6:
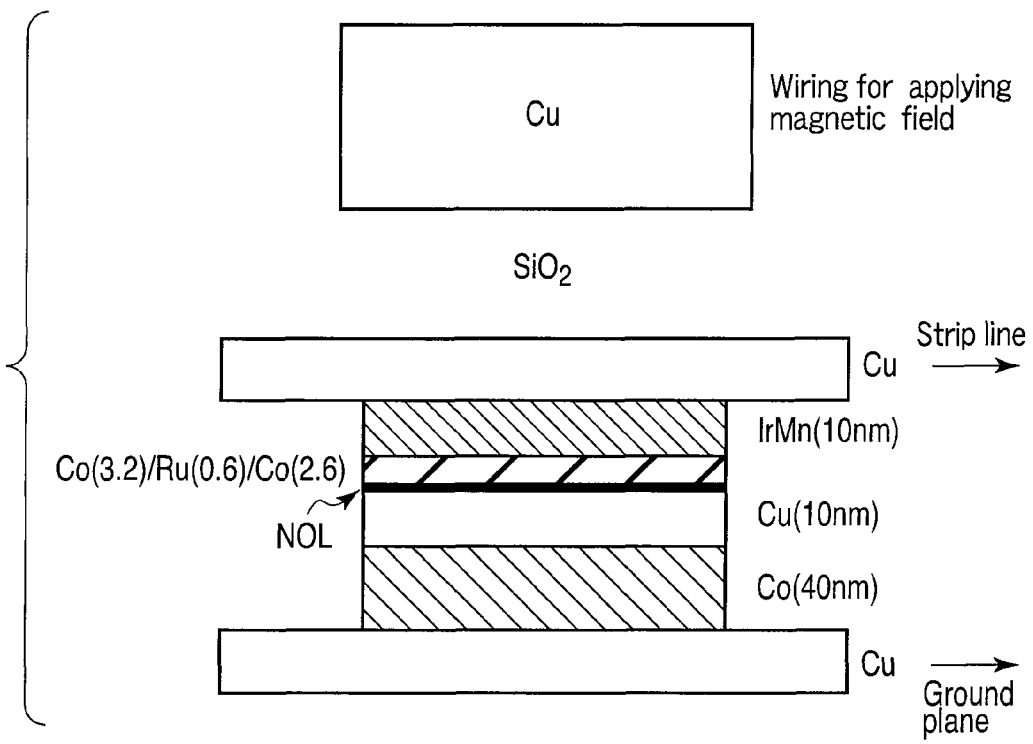
FIG. 6 is a diagram illustrating a structure of the magnetic oscillation device.

The magnetic oscillation element 21 used in the above-mentioned reproduction circuit comprises a magnetic oscillation element fabricated on a silicon substrate as shown in FIG. 6 using a sputtering film formation method and a light and electron beam lithography. The element size is 100×200 nm, and the top and bottom electrodes of Cu are connected to a strip line and a ground plane respectively. The free layer uses artificial ferrimagnetic material of Co (3.2 nm)/Ru (0.6 nm)/Co (2.6 nm), and the magnetization fixed layer uses an in-face magnetic film of Co (40 nm). Antiferromagnetic material IrMn (10 nm) is used for the free layer to which the exchange magnetic field of about 3000 Oe is applied. The Co (3.2 nm) film, magnetization fixed layer and antiferromagnetism layer of the free layer are formed under the magnetic field about 2000 e. The anisotropy axes of the free layer film and magnetization fixed layer film are coincided with each other. NOL is formed between the free layer and nonmagnetic layers (Cu10 nm) to increase the element resistor (in magnetization parallelism) to 48Ω. Cu wiring for applying a high frequency magnetic field to an element through an insulator layer (SiO2) is formed on the element.

Figure 7:
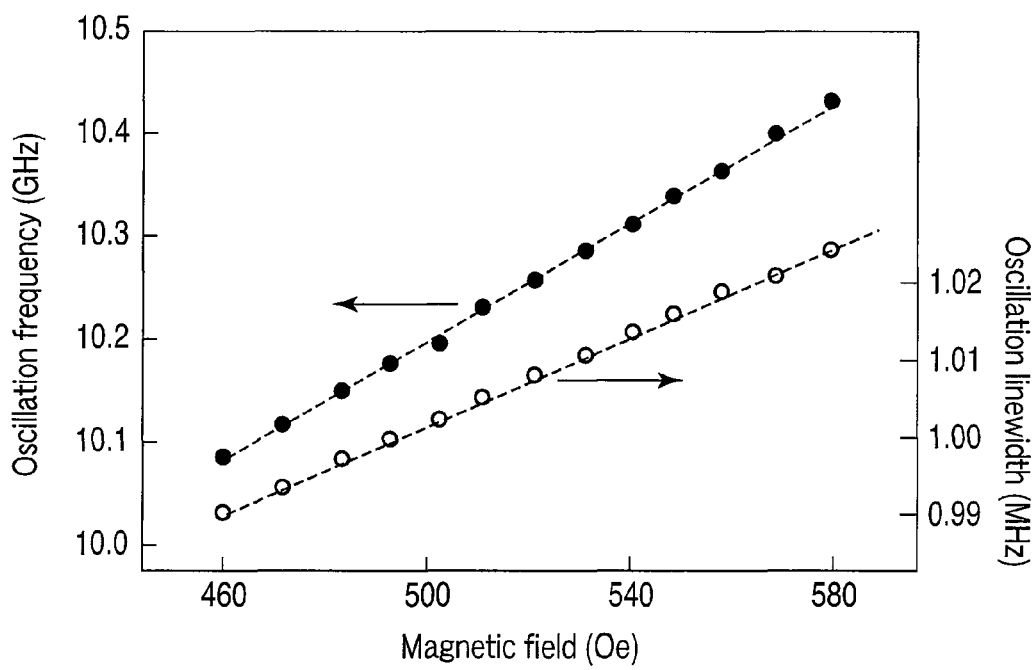
FIG. 7 is a diagram illustrating an external magnetic field dependence characteristic of an oscillation frequency and a oscillation linewidth when an element current is fixed.

The MR ratio of the element which is measured by applying an external magnetic field with an electromagnet is 2.5%. A direct current is supplied to this element using a bias tee, and the microwave output terminal of the bias tee is connected to a spectrum analyzer through an amplifier of amplification factor 40 dB, whereby oscillation spectrum is measured. FIG. 7 shows external magnetic field dependence characteristics of the oscillation frequency and oscillation linewidth in a state that the element current is fixed to 1.5 mA. The oscillation linewidth (half-width) is measured by fitting the spectrum along a Lorenz curve. The oscillation frequency is 10.20 GHz under an external magnetic field 500 Oe, the magnetic field dependence indicates about 3 MHz/Oe, and the oscillation linewidth is about 1 MHz. The external magnetic field is generated by an electromagnet or by flowing a direct current to a wiring for applying a high frequency magnetic field as shown in FIG. 6. The calibration of the latter magnetic field is performed, too.

Figure 8:
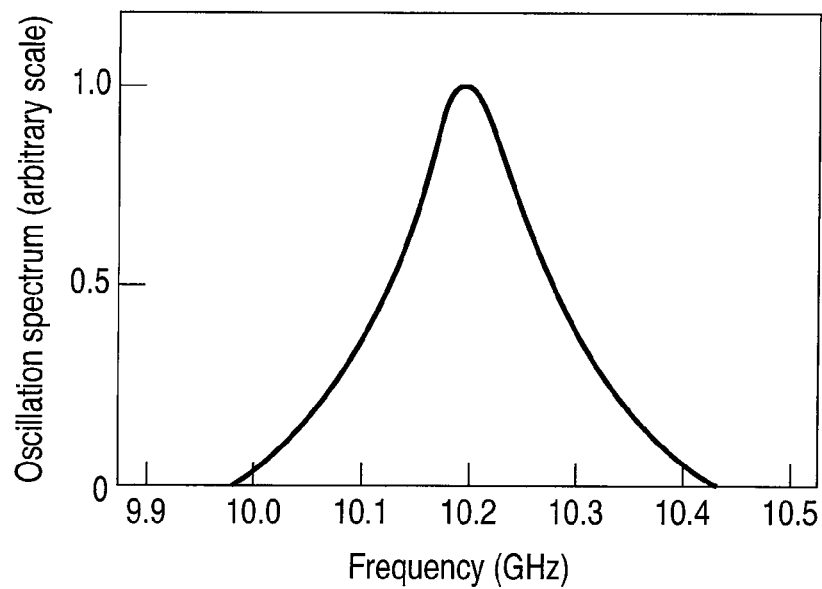
FIG. 8 is a diagram illustrating a relation between an oscillation spectrum and a frequency.

A radio frequency pulse current is applied to the high frequency magnetic field applying wiring in a state that the element current and the electromagnet magnetic field are fixed to 1.5 mA and 500 Oe, respectively, and the oscillation frequency is fixed to 10.20 GHz, to generate a false signal magnetic field. The cycle T of the pulsed current (bit length of about 3 ns) is set to 2.917 ns (n=30) in consideration with the above-mentioned condition $\omega_0 T = 2n\pi - \pi/2$ (where $\omega_0 = 2\pi f_0$, $f_0 = 10.20$ GHz). Also, the magnetic field hs generated by a radio frequency pulse current is assumed to be hs=30.61 Oe derived from the condition $2\Delta fT = 0.5$ of MSK. The oscillation spectrum observed in the state that the high frequency magnetic field of hs is generated at random is shown in FIG. 8. In this measurement, an amplitude noise is removed by arranging a voltage limiter of ±100 mV on the previous stage of the spectrum analyzer. The band width increased by modulation is about 0.5 GHz, and coincides with the band width expected by the MSK modulation.

Figure 9:
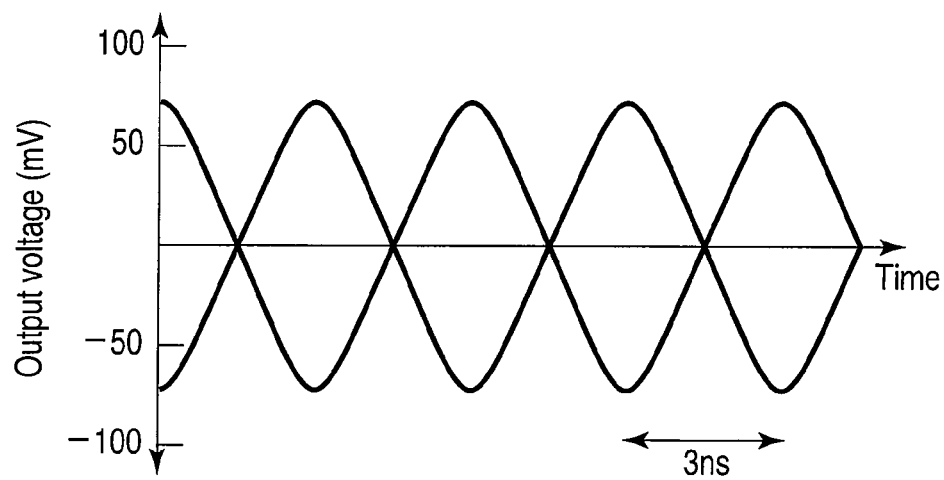
FIG. 9 is a diagram illustrating an eye pattern of an output of a detector circuit displayed by a synchroscope.

Subsequently, the output terminal of the voltage limiter 22 of FIG. 5 is connected to the delay detection device 23 instead of the spectrum analyzer, to measure a detection output. The delay circuit of the delay detection device 23, that is, the delay circuit 11 of the detector circuit of FIG. 2 uses a ferrite delay element using a YIG film. The eye pattern observed by connecting the output of the delay detection device 23 to a synchroscope is shown in FIG. 9. It is seen that the eye opens every time T=3 ns greatly, and detection is possible at this timing. The signal-to-noise ratio estimated by the eye pattern is about 40 (32 dB).

Figure 10:
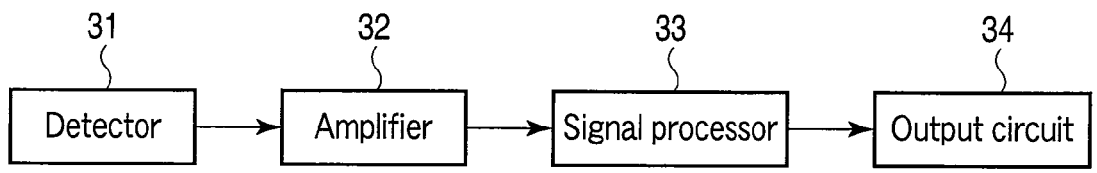
FIG. 10 is a block circuit diagram of a magnetic recording and reproducing apparatus according to a second embodiment.

There will now be described a magnetic recording and reproducing apparatus using the reproducing circuit shown in FIG. 5 as the second embodiment. The magnetic recording and reproducing apparatus comprises a reproducing circuit 31, an amplifier 32, a signal processor 33 and an output circuit 34 shown in FIG. 5 as shown in FIG. 10. The amplifier circuit 32 amplifies the detection signal from the reproducing circuit 31, and inputs the amplified signal to the signal processor 33. The signal processor processes the amplified signal and generates a reproduced signal. This reproduced signal is provided to a user with the output circuit 34.

The signal detection of high signal-to-noise ratio becomes possible by detecting the phase difference between adjacent signals from the magnetic oscillation element whose oscillation frequency is modulated by a medium magnetic field, thereby reading a medium signal.

The signal-to-noise ratio depends upon the oscillation linewidth of the magnetic oscillation element. However, if an artificial antiferromagnetism film, an artificial ferrimagnetism film or a vertical magnetization film is used for the free layer, a stable magnetic oscillation element with a short oscillation linewidth can be acquired.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal reproducing method includes:
    deriving adjacent signals from a magnetic oscillation element whose oscillation frequency is modulated by a medium magnetic field; and
    reproducing a medium record signal by detecting a phase difference between the adjacent signals derived from the magnetic oscillation element.

2. The method according to claim 1, wherein the deriving includes deriving a current signal from the magnetic oscillation element and obtaining a delay signal by delaying a signal just before the current signal, and the reproducing includes detecting the phase difference between the current signal and the delay signal.

3. The method according to claim 2, wherein the reproducing includes reproducing a medium record signal at a timing at which $\phi(t)-\phi(t-T)$ is $\pm\pi/2$ at a border of a bit according to a following equation $$v(t) = <s(t) \cdot s(t-T)>$$
$$= (A^2/2)\cos[\omega_0 T + \varphi(t) - \varphi(t-T)]$$
$$s(t) = A\cos[\omega_0 t + \varphi(t)], s(t-T)$$
$$= A\cos[\omega_0(t-T) + \varphi(t-T)], \omega_0 T$$
$$= 2n\pi - \pi/2$$

where s(t) indicates the current signal, s(t–T) indicates the delay signal, $\omega_0$ indicates an oscillation frequency when there is no medium magnetic field.

4. A magnetic head, comprising:
a magnetic oscillation element whose oscillation frequency is modulated by a medium magnetic field; and
a reproducing device configured to detect a phase difference between adjacent oscillation signals derived from the magnetic oscillation element and output a phase difference signal as a reproduced signal.

5. The magnetic head according to claim 4, wherein the reproducing device comprises a delay detector to generate a reproduced signal by comparing a current signal derived from the magnetic oscillation element with a signal obtained by delaying a signal just before the current signal.

6. The magnetic head according to claim 4, wherein a modulation index of the oscillation frequency modulation is 0.5.

7. The magnetic head according to claim 4, further comprising an amplitude control circuit arranged on a previous stage of the delay detector to control an amplitude of a voltage or current.

8. The magnetic head according to claim 4, wherein the free layer configuring the magnetic oscillation element is formed of artificial ferrimagnetic material or artificial antiferromagnetic material.

9. The magnetic head according to claim 8, wherein an exchange bias is applied to the free layer by antiferromagnetic material.

10. The magnetic head according to claim 4, wherein the free layer is formed of a vertically magnetization film.

11. The magnetic head according to claim 6, wherein the vertical magnetization film is formed of a Co or Co/nonmagnetic material laminated layer or CoCr system alloy such as CoCrTa, CoCrTaPt or CoTaNb, a Co multilayer film such as Co/Pd, Co/Pt or Co—Cr—Ta/Pd, a CoCrPt system alloy, a FePt system alloy, or a SmCo system alloy including rare earths or a TbFeCo alloy.

12. The magnetic recording and reproducing apparatus, comprising the magnetic head according to claim 4 and a signal processor to processes the detected signal of the magnetic head to produce the reproduced signal.

13. The magnetic recording and reproducing apparatus according to claim 12, wherein the reproducing device comprises a delay detector to generate a reproduced signal by comparing a current signal derived from the magnetic oscillation element with a signal obtained by delaying a signal just before the current signal.

14. The magnetic recording and reproducing apparatus according to claim 12, further comprising an amplitude control circuit arranged on a previous stage of the delay detector to control an amplitude of a voltage or current.

* * * * *